United States Patent Office 3,652,465
Patented Mar. 28, 1972

3,652,465
PROCESS FOR PRODUCING POLYMERS OF CYCLIC ACETALS
Koichi Takakura, Kurashiki, Japan, assignor to Kuraray Co., Ltd., Kurashiki, Japan
No Drawing. Filed June 24, 1970, Ser. No. 49,545
Claims priority, application Japan, July 8, 1969, 44/53,987
Int. Cl. C08g 11/00
U.S. Cl. 260—2 BP                                 7 Claims

ABSTRACT OF THE DISCLOSURE

Cyclic acetals such as 1,3-dioxolane can be polymerized at high conversion rates to polyethers by using a catalyst system consisting of a zinc halide and a carbon tetrahalide.

---

The present invention relates to a process for producing polymers of cyclic acetals, and more particularly, it relates to a process for producing said polymers by ring-opening polymerization, using the binary catalyst system which consists of a zinc halide and a carbon tetrahalide.

Cyclic acetals which can be polymerized in accordance with this invention are those represented by the group consisting of 1,3-dioxolane, 1,3-dioxepane and 1,3,6-trioxocane.

It has been known that cyclic acetals can generally be polymerized by ring-opening polymerization in a cationic system to give polyethers in the presence of a mineral acid catalyst such as perchloric acid, sulfuric acid and phosphoric acid, or a Friedel-Crafts type catalyst such as boron trifluoride, ferric chloride and aluminum chloride. For example, 1,3-dioxolane, which is a 5-membered cyclic acetal can be polymerized to give polymers having properties ranging from liquid to solid with the use of a catalyst such as $HClO_4$, $BF_3$, $FeCl_3$ and $SnCl_4$, or with the use of mixed catalyst system consisting of a combination of said catalyst and acetic anhydride or acetyl chloride as a promoter. However, since said catalyst systems are either low in their activity or tend to produce colored, low molecular weight polymers, these catalysts are not generally considered satisfactory for practical, commercial use.

Further, it is well known that in the cationic polymerizations using metal halide catalysts, hydrochloric acid, thionyl chloride, carboxylic acid chlorides such as acetyl chloride and benzoyl chloride, acid anhydrides such as acetic anhydride, and alkyl chlorides such as butyl chloride can act as effective promoters. However, these binary catalyst systems generally do not bring about sufficient yields of polymers of 1,3-dioxolane, 1,3-dioxepane or 1,3,6-trioxocane.

Accordingly, it is the primary object of the present invention to provide a process according to which cyclic aectals such as 1,3-dioxolane, 1,3-dioxepane and 1,3,6-trioxocane can be polymerized at high conversion rates to give polyethers of relatively high molecular weight. Other objects of this invention will be apparent from the ensuing description.

In accordance with this invention, the above objects are achieved by polymerizing at least one cyclic acetal in the presence of a catalyst system consisting of a combination of a zinc halide and a carbon tetrahalide, said zinc halide being present within the range of between 0.01 mole percent and 10 mole percent based on the monomeric acetal and said carbon tetrahalide being present within the range of between 0.1 mole and 10 moles per mole of zinc halide.

Zinc halides used as a catalyst component in the present invention show very little catalytic activity by themselves, and would hardly cause the polymerization of cyclic acetals when the reaction temperature is below room temperature. However, in accordance with the present invention, when the catalyst system consisting of a zinc halide in combination with a carbon tetrahalide is used, the ring-opening polymerization of the cyclic acetals can be greatly accelerated and the polymerization proceeds up to higher conversion of about 100%′ with good reproducibility.

The promoter action of carbon tetrahalides is most pronounced in the present invention when it is combined with zinc halide. The use of another metal halide instead of zinc halide, or a halomethane such as chloroform, methylene chloride or methylene bromide in place of a carbon tetrahalide, could not bring about desired results. For instance, a mixed catalyst of zinc halide and a halomethane other than a carbon tetrahalide would not shown any higher activity than zinc halide alone. It has been found that although 1,3,6-trioxocane may be polymerized by only carbon tetrahalide, the polymerization can be greatly accelerated by using carbon tetrahalide in combination with zinc halide according to the invention.

The zinc halide component of the catalyst systems of this invention includes zinc fluoride, zinc chloride, zinc bromide and zinc iodide. Zinc chloride and zinc bromide, especially the latter, have been found most preferable for preparing a catalyst having high activity. The halogen of carbon tetrahalide may be selected from any one of the group of fluorine, chlorine, bromine and iodine, the tetrachloride and tetrabromide, especially the latter, being most preferable for the same reason as given above in the cast of the zinc halide. Thus the highest catalytic activity in the present invention is observed for the mixed catalyst system consisting of zinc bromide and carbon tetrabromide; and, advantageously, the polymers resulting from the use of such catalyst systems are colorless. It is not necessary to use the same halogen atoms for both the zinc halide and carbon tetrahalide, i.e. the polymer can be produced in high yield using a catalyst system consisting of, for example, zinc bromide and carbon tetrachloride.

The promoter action of carbon tetrahalide in the mixed catalyst system of the present invention is appreciable even at the concentration of carbon tetrahalide as little as 0.1 mole per mole of zinc halide, but generally excellent results are obtained when the amount of carbon tetrahalide used is more than 0.5 mole per mole of zinc halide. It will not be necessary to employ carbon tetrahalide in an amount greater than 10 moles per mole of zinc halide. Zinc halide which is the main catalyst-forming component in the present invention should be used in an amount sufficient to exhibit catalytic action when it is mixed with carbon tetrahalide. The optimum results will be opatined when zinc halide is used in an amount of at least 0.01 mole percent, preferably more than 0.1 mole percent based on the monomer to be polymerized. No significant advantage may be obtained by the use of more than 5 mole percent of zinc halide, and especially more than 10 mole percent.

The binary catalyst system of the present invention can be prepared by merely mixing zinc halide and carbon tetrahalide. The mixing may be carried out either in the presence or in the absence of the cyclic acetal to be polymerized. For example, two catalyst components may be introduced directly into a reactor already containing the monomer or into which the monomer is subsequently added. When this procedure is employed, polymerization occurs simultaneously with the preparation of the catalyst. Polymerization of the cyclic acetals according to the invention, therefor, can be effected by various methods as mentioned below: a method wherein two catalyst components and the monomer are mixed simultaneously; a method wherein one of the catalyst components and the monomer are mixed, and then the remaining catalyst component is added to the initial mixture; a method wherein the monomer is contacted with the catalyst system which has previously been prepared. The one shot method in which the two catalyst components and the monomer are mixed simultaneously is the most practical of all those named.

Cyclic acetals to be polymerized in accordance with the invention, as given hereinabove, are 1,3-dioxolane, 1,3-dioxepane and 1,3,6-trioxocane; in particular 1,3-dioxolane and 1,3,6-trioxocane are polymerized effectively. Copolymers of cyclic acetals can be obtained not only by the use of a mixture of said cyclic acetals but also by the use of the following co-monomers: substituted 1,3-dioxolanes such as 2-methyl-1,3-dioxolane, 4-methyl-1,3-dioxolane, 2,2-dimethyl-1,3-dioxolane and 4-phenyl-1,3-dioxolane; substituted 1,3-dioxepanes such as 2-methyl 1,3-dioxepane and 2-propyl-1,3-dioxepane; substituted trioxocanes such as 2-isopropyl-1,3,6-trioxocane and 2-(1-ethylphenyl)-1,3,6-trioxocane; 1,3-dioxanes such as 1,3-dioxane, 2 - methyl-1,3-dioxane and 4,4-dimethyl-1,3-dioxane; oxetanes such as 3-methyl-oxetane and 3,3-bis-(chloromethyl)-oxetane; alkylene oxides such as ethylene oxide, epichlorohydrin, propylene oxide and isobutylene oxide; trioxane; and tetraoxane.

The polymerization of the cyclic acetals in accordance with the invention may be carried out in the presence of an inert organic solvent. However, high conversion is more easily obtained in bulk polymerization wherein the solvent is omitted. As for the solvents, aliphatic hydrocarbons, aromatic hydrocarbons, ethers and ketones such as nitrobenzene, n-hexane, n-heptane, isooctane, cyclohexane, benzene, toluene, xylene, chlorobenzene, ethylene dichloride, methylene chloride, chloroform, petroleum ether, ethyl ether, tetrahydrofuran, and 1,4-dioxane may be used.

In bulk polymerization, the viscosity of the reaction system increases as the reaction proceeds, and in many cases, the whole reaction system eventually solidifies homogeneously. In solution polymerization where the resultant polymers are soluble, concentrated homogeneous solutions of the resultant polymers are generally obtained. However, since polymers do not dissolve in the aliphatic hydrocarbons such as n-hexane and n-heptane, the resultant polymers precipitate at the bottom of the reactor in the form of slurry when said solvents are used.

Reaction temperature is not of a significant factor for the polymerization of the cyclic acetals in accordance with the present invention, and quite a wide range of temperatures ranging from —80° C. to 150° C. can be employed. However, at high temperatures, the degree of polymerization decreases while the polymerization rate increases. The temperatures which are preferred for the polymerization of the present invention are in the range of 0° C. and the boiling point of either the monomers or solvents. Ambient temperatures are especially preferred.

The polymerization is not esesntially influenced by pressure. If necessary, it is possible to apply pressure to avoid the loss of the monomers or solvents due to evaporation at elevated reaction temperatures.

The presence of compounds containing active hydrogen atoms (such as water or alcohols) in the reaction system, should be avoided as much as possible since such compounds inhibit the polymerization.

The present invention provides a method which enables the polymerization of cyclic acetals to proceed up to conversions as high as 100% under conditions when the reaction is conducted in an air or inert gas atmosphere.

Polymers produced in accordance with the method of the present invention have the polyether structure and may be in the form of viscous liquid, grease or solid depending on the types of cyclic acetals and comonomers used and the reaction conditions employed. For example, polymers obtained by the polymerization of 1,3-dioxolane and 1,3,6-trioxocane are white crystalline solids having the melting point of 45° C.–55° C. and 35° C.–42° C., respectively. These polymers may be formed into fibers and films in accordance with the purpose for which it is to be used. Since many of the polymers produced in accordance with the present invention are soluble in water as well as in most of organic solvents, they can be used in a wide range of applications employing the water-soluble polyether from ethylene oxide polymer, in the fields of pharmaceuticals, fibers and paper processing, as after-treating agents for fibers, coagulants, plasticizers or thickening agents.

The nature and features of the invention will be further apparent from the following specific examples.

EXAMPLE 1

1.15 g. of 1,3-dioxolane ($1.55 \times 10^{-2}$ moles), 0.015 g. of zinc bromide (0.43 mole percent based on 1,3-dioxolane) and 0.023 g. of carbon tetrabromide (approximately 1.04 moles per mole of zinc bromide) were charged into a glass ampoule. The ampoule was sealed in an atmosphere of nitrogen gas, and thereafter the reaction system was maintained at 30° C. for 18 hours. The reaction system gradually became viscous and finally solidified. After the reaction completed, the catalyst system was decomposed by the addition of small amount of methanol solution containing 5% ammonia, then the resultant polymer in the form of a white solid was crushed and poured into petroleum ether, wherein the polymer was precipitated in the form of a finely divided solid material. The polymer thus recovered was then rinsed with cold methanol and dried under the reduced pressure. The polymer obtained was a white powder. The polymer yield was 67% by weight. The elemental analysis indicated that the polymer contained 48.27% C, 8.11% H and 0.62% Br. The melting point was 56° C.; the reduced viscosity (1% aqueous solution, 30° C.) was 0.14 dl./g. The same polymerization at an elevated temperature of 55° C. proceeded at an increased reaction rate as compared with that at 30° C., and the polymer yield after 10 hours was 63%.

In an experiment similar to the above mentioned experiment, polymer was hardly produced when zinc bromide and carbon tetrabromide were used separately.

EXAMPLE 2

1.15 g. of 1,3-dioxolane ($1.55 \times 10^{-2}$ mole), 0.011 g. of anhydrous zinc chloride (0.52 mole percent based on 1,3-dioxolane) and 0.075 g. of carbon tetrachloride (1.4 mole per mole of zinc chloride) were charged to the reactor. The reaction was continued at 30° C. for 51 hours in the same manner as in the foregoing Example 1. The final product was white powdery polymer having 0.12 dl./g. of reduced viscosity. The polymer yield was 93%.

In an experiment similar to the above experiment, polymer was hardly produced when zinc chloride and carbon tetrachloride were used separately.

EXAMPLE 3

To the mixture of 1.15 g. of 1,3-dioxolane and 1.25 g. of 1,3,6-trioxocane were added 0.030 g. of zinc bromide (approx. 0.48 mole percent based on mixed cyclic acetals) and 0.045 g. of carbon tetrabromide (approx. 1 mole per mole zinc bromide). The reaction system was maintained at 30° C. for 20 hours in the same manner as given in Example 1. The said system gradually became viscous and finally gave a transparent gel. The polymer yield was 82%. The resultant white powder-like polymer had the reduced viscosity of 0.13 dl./g.

EXAMPLE 4

The reaction was carried out in the same manner as in Example 1 using mixture of 0.98 g. of 1,3-dioxolane and 0.22 g. of 2-methyl-1,3-dioxolane in place of the 1.15 g.

of 1,3-dioxolane of Example 1. White powdery copolymer was obtained in yield of 52%.

EXAMPLE 5

The polymerization of 1,3-dioxolane using a catalyst consisting of zinc bromide and carbon tetrabromide in the molar ratio of 1:1, was carried out in the presence of various solvents at 0° C. in the same manner as given in Example 1. Zinc bromide was used in the amount of 0.3 mole percent based on the monomer, and the solvents were used in the same volume as the monomers. The yields of polymer after 48 hours are given in the Table 1 below:

TABLE 1

| Solvent: | Polymer yield (percent) |
|---|---|
| ---- | 92 |
| n-Hexane | 64 |
| Benzene | 55 |
| Carbon tetrachloride | 56 |
| Ethylene chloride | 56 |
| 1,4-dioxane | 57 |
| Tetrahydrofuran | 47 |

The polymers produced were white waxes which are easily soluble in water. The reduced viscosity was 0.1–0.2 dl./g. and the melting point was 40–55° C. Thermobalance measurements on the polymers showed no weight loss up to 200° C. in air.

EXAMPLE 6

To 1.25 g. of 1,3,6-trioxocane (1.06×10$^{-2}$ mole) were added 0.01 g. of zinc bromide (0.42 mole percent based on the monomer) and 0.01 g. of carbon tetrabromide (0.68 mole per mole of zinc bromide). The polymerization reaction was carried out for 48 hours at 0° C. Immediately after the reaction began, the reaction system became viscous and finally solidified homogeneously. The resultant solid was rinsed with cold n-hexane and then dried under the reduced pressure, yielding white wax-like polymer. The polymer yield was 96%. The melting point of the polymer was 39° C. A decrease in the weight of the polymers was not observed until they had been heated to a temperature of 200° C.

When carbon tetrabromide alone was used instead of the mixed catalyst in the Example 6, the reaction system became gradually viscous, and a grease-like polymer was obtained in a yield of 20%.

EXAMPLE 7

Zinc iodide and carbon tetraiodide were added to 1.25 g. of 1,3,6-trioxocane, and the reaction system was subjected to bulk polymerization at 30° C. The content of zinc iodide was 0.5 mole percent based on the monomer, and carbon tetraiodide was used in the same molar amount as zinc iodide. The reaction system was brown in color, and gradually became viscous, ultimately turning to jelly. After having been rinsed with cold n-hexane, the resultant polymer was dried under the reduced pressure. The polymer yield was 83%, and the polymer obtained was a brown, colored wax.

EXAMPLE 8

2 g. of 1,3-dioxepane was added with a mixed catalyst consisting of zinc halide and carbon tetrahalide listed in the following Table 2. The amount of zinc halide was 0.45 mole percent based on the monomer, and that of carbon tetrahalide was in the same molar quantity as zinc halide. The reaction system was subjected to bulk polymerization, and grease-like polymers were obtained. The polymer yields after 27 hours of reaction are given in Table 2.

TABLE 2

| Catalyst | Polymerization temp. (° C.) | Yield percent |
|---|---|---|
| ZnBr$_2$–CBr$_4$ | 30 | 100 |
| ZnBr$_2$–CBr$_4$ | 0 | 92 |
| ZnBr$_2$–CCl$_4$ | 30 | 92 |
| ZnCl$_2$–CCl$_4$ | 30 | 82 |

What is claimed is:

1. A process for producing polymers of cyclic acetals which comprises polymerizing at least one cyclic acetal monomer in the presence of a catalyst system consisting of a combination of zinc halide and carbon tetrahalide, said zinc halide being present within the range of between 0.01 mole percent and 10 mole percent based on the monomer, and carbon tetrahalide being present within the range of between 0.1 mole and 10 moles per mole of zinc halide.

2. A process for producing polymers of cyclic acetals which comprises polymerizing at least one cyclic acetal selected from the group consisting of 1,3-dioxolane, 1,3-dioxepane and 1,3,6-trioxocane in the presence of a catalyst system consisting of a combination of zinc halide and carbon tetrahalide, said zinc halide being present within the range of between 0.01 mole percent and 10 mole percent based on the monomer, and carbon tetrahalide being present within the range of between 0.1 mole and 10 mole per mole of zinc halide.

3. A process as claimed in claim 2 wherein the cyclic acetal is 1,3-dioxolane.

4. A process as claimed in claim 2 wherein the cyclic acetal is 1,3-dioxepane.

5. A process as claimed in claim 2 wherein the cyclic acetal is 1,3,6-trioxocane.

6. A process as claimed in claim 2 wherein said acetal is polymerized in admixture with a comonomer selected from the group consisting of 2-methyl-1,3-dioxolane, ethylene oxide and propylene oxide.

7. A process for producing polymers of cyclic acetals which comprises polymerizing at least one of cyclic acetal selected from the group consisting of 1,3-dioxolane, 1,3-dioxepane and 1,3,6-trioxocane in the presence of a catalyst system consisting of a combination of zinc bromide and carbon tetrabromide, said zinc bromide being present within the range of between 0.01 mole percent and 10 mole percent based on the monomer, and carbon tetrabromide being present within the range of between 0.1 mole and 10 moles per mole of zinc bromide.

References Cited

UNITED STATES PATENTS 3,194,788   7/1965   Küllmer et al. _____ 260—67
3,457,226   7/1969   Miyake et al. _____ 260—67

OTHER REFERENCES

Chemical Abstracts 52, 10642b (1958).
Chemical Abstracts 57, 15345g (1962).

WILLIAM H. SHORT, Primary Examiner

E. A. NIELSEN, Assistant Examiner

U.S. Cl. X.R.

260—2 R, 67 FP, 615 A, 615 B